United States Patent [19]
Billings et al.

[11] Patent Number: 5,566,299
[45] Date of Patent: Oct. 15, 1996

[54] FAULT TOLERANT METHOD AND SYSTEM FOR HIGH AVAILABILITY DOCUMENT IMAGE AND CODED DATA PROCESSING

[75] Inventors: Douglas W. Billings, Gaithersburg; James W. Cullen, Frederick; William W. Klein, Olney, all of Md.; Robert E. Probst, Reston, Va.; George J. Meyers, III, Annapolis; Walter C. Rose, Frederick, both of Md.

[73] Assignee: Lockheed Martin Corporation, Bethesda, Md.

[21] Appl. No.: 175,825

[22] Filed: Dec. 30, 1993

[51] Int. Cl.$^6$ .................................................. G06F 11/00
[52] U.S. Cl. .................... 395/182.02; 364/268; 364/265; 364/268.9; 364/284.4; 364/DIG. 1
[58] Field of Search ............................... 395/800, 182.02, 395/182.11

[56] References Cited

U.S. PATENT DOCUMENTS

| | | | |
|---|---|---|---|
| 5,008,805 | 4/1991 | Fiebig et al. | 364/184 |
| 5,031,223 | 7/1991 | Rosenbaum et al. | 364/478 |
| 5,157,663 | 10/1992 | Major | 371/9.1 |
| 5,227,778 | 6/1993 | Vacon | 340/825.52 |

Primary Examiner—Eric Coleman
Attorney, Agent, or Firm—Andrew J. Dillon

[57] ABSTRACT

A high availability method and system manipulate and store document images and coded data. The method and system include an image local area network and a coded data local area network. The image local area network is operated at a high utilization because of the relatively large size of the image files transmitted over it. The coded data local area network is operated at a relatively low utilization level because of a relatively small size of the coded data files transmitted over it. Two or more work group servers are connected to the image local area network. Each work group server is connected through a work group local area network to the coded data local area network. Each work group server operates in both a primary mode to service its own work group LAN and in a hot standby mode to serve as a backup processor for its corresponding work group server when the corresponding work group server is in a failure mode. When the failure mode occurs, a local area network manager reroutes image files from the first work group local area network over the under utilized coded data local area network, to the second work group local area network and its work group server which is operating in a hot standby mode. In this manner, a high availability is provided for the image file processing and coded data processing by providing alternate LAN links having adequate capacity to accommodate the large rerouted image files.

8 Claims, 3 Drawing Sheets

FIG. 2        200

BEGIN METHOD FOR HIGH AVAILABILITY DOCUMENT IMAGE AND CODED DATA PROCESSING

202

PROCESSING IMAGE FILES AND CODED DATA FILES IN A FIRST WORK GROUP SERVER COUPLED BETWEEN AN IMAGE LOCAL AREA NETWORK PRIMARILY COMMUNICATING IMAGE FILES AND HAVING A FIRST UTILIZATION, AND A FIRST WORK GROUP LOCAL AREA NETWORK, HAVING AT LEAST ONE WORKSTATION PROCESSOR

204

PRIMARILY COMMUNICATING CODED DATA FROM THE FIRST WORK GROUP LAN COUPLED OVER A BACKBONE LAN THAT HAS A SECOND UTILIZATION LESS THAN THE FIRST UTILIZATION

206

PROCESSING IMAGE FILES AND CODED DATA FILES IN A SECOND WORK GROUP SERVER COUPLED BETWEEN THE IMAGE LAN AND A SECOND WORK GROUP LAN, THE SECOND WORK GROUP LAN BEING COUPLED TO THE BACKBONE LAN

208

ASSIGNING A FIRST WORK GROUP SERVER DESTINATION ADDRESS TO THE WORKSTATION PROCESSOR USING A LOCAL AREA NETWORK MANAGER COUPLED TO BOTH THE IMAGE LAN AND THE BACKBONE LAN

210

RECEIVING AN ALERT MESSAGE IN THE LAN MANAGER OVER THE IMAGE LAN FROM THE FIRST WORK GROUP SERVER, REPRESENTING A FAILING CONDITION OF THE FIRST WORK GROUP SERVER

212

SENDING A SECOND WORK GROUP SERVER DESTINATION ADDRESS FROM THE LAN MANAGER, TO THE WORKSTATION PROCESSOR, IN RESPONSE TO THE ALERT, TO COMMUNICATE OVER THE FIRST WORK GROUP LAN, THE BACKBONE LAN, AND THE SECOND WORK GROUP LAN, TO THE SECOND WORK GROUP SERVER

302 — IN NORMAL MODE, WORKSTATION PROCESSOR 21 SCANS IN DOCUMENT IMAGE FROM SCANNER 26 AND SENDS IT OVER WORK GROUP LAN 20 TO WORKSTATION PROCESSOR 22 FOR CHARACTER RECOGNITION WITH OCR 28. PROCESSOR 22 TRANSMITS OCR CODED DATA OVER WORK GROUP LAN 20 AND OVER LOW UTILIZATION CODED DATA LAN 40 TO A UTILIZATION DEVICE, SUCH AS THE ARCHIVE STORE 45.

304 — IN NORMAL MODE, FIRST WORK GROUP SERVER 25 MANAGES THE TRANSMISSION OF THE DOCUMENT IMAGE FROM WORKSTATION PROCESSOR 21 OR 22 TO THE HIGH UTILIZATION IMAGE LAN 10, THAT TRANSMITS IT TO A UTILIZATION DEVICE, SUCH AS ARCHIVE STORE 45. SERVER 25 SENDS OUT HEART BEAT SIGNALS TO STANDBY MONITOR 25' IN SECOND WORK GROUP SERVER PROCESSOR 35.

306 — IN NORMAL MODE, WORKSTATION PROCESSOR 33 SCANS IN DOCUMENT IMAGE FROM SCANNER 36 AND SENDS IT OVER WORK GROUP LAN 30 TO WORKSTATION PROCESSOR 34 FOR CHARACTER RECOGNITION WITH OCR 38. PROCESSOR 34 TRANSMITS OCR CODED DATA OVER WORK GROUP LAN 30 AND OVER LOW UTILIZATION CODED DATA LAN 40 TO A UTILIZATION DEVICE, SUCH AS THE ARCHIVE STORE 45.

308 — IN NORMAL MODE, SECOND WORK GROUP SERVER 35 MANAGES THE TRANSMISSION OF THE DOCUMENT IMAGE FROM WORKSTATION PROCESSOR 33 OR 34 TO THE HIGH UTILIZATION IMAGE LAN 10, THAT TRANSMITS IT TO A UTILIZATION DEVICE, SUCH AS ARCHIVE STORE 45. SERVER 35 SENDS OUT HEART BEAT SIGNALS TO STANDBY MONITOR 35' IN FIRST WORK GROUP SERVER PROCESSOR 25.

310 — IN FAILURE MODE, THE SECOND WORK GROUP SERVER 35 BEGINS TO FAIL AND THIS CHANGES THE HEART BEAT SIGNALS RECEIVED BY STANDBY MONITOR 35' IN FIRST WORK GROUP SERVER 25. IN RESPONSE, FIRST WORK GROUP SERVER 25 SENDS AN ALARM SIGNAL OVER EITHER THE HIGH UTILIZATION IMAGE LAN 10 OR THE LOW UTILIZATION DATA LAN 40 TO THE LAN MANAGER 50.

312 — IN RESPONSE, THE SWITCH-OVER MANAGER 50' IN THE LAN MANAGER 50 SENDS THE DESTINATION ADDRESS FOR THE FIRST WORK GROUP SERVER 25, OVER THE CODED DATA LAN 40, TO EACH WORKSTATION PROCESSOR 31, 32, 33, AND 34 IN THE WORK GROUP 30. ALSO, THE SWITCH-OVER MANAGER 50' IN THE LAN MANAGER 50 SENDS THE DESTINATION ADDRESS FOR EACH WORKSTATION PROCESSOR 31, 32, 33, AND 34 IN THE WORK GROUP 30, OVER THE LAN 40 AND LAN 20 TO THE FIRST WORK GROUP SERVER 25. ALSO, THE SWITH-OVER MANAGER 50' SENDS A DISABLING SIGNAL OVER LAN 40 AND LAN 30 TO THE SECOND WORK GROUP SERVER 35.

314 — IN FAILURE MODE, DOCUMENT IMAGES FROM WORKSTATION PROCESSOR 33 OR 34 ARE NOW SENT OVER THE LOW UTILIZATION CODED DATA LAN 40 AND THE WORK GROUP LAN 20, TO THE FIRST WORK GROUP SERVER PROCESSOR 25, THAT TRANSMITS THEM OVER THE HIGH UTILIZATION LAN 10 TO A UTILIZATION DEVICE, SUCH AS ARCHIVE STORE 45.

FAULT TOLERANT METHOD AND SYSTEM FOR HIGH AVAILABILITY DOCUMENT IMAGE AND CODED DATA PROCESSING

BACKGROUND OF THE INVENTION

1. Technical Field

The invention disclosed broadly relates to data processing systems and methods and more particularly relates to document image and coded data processing.

2. Related Patent

This patent application is related to U.S. Pat. No. 5,008,805 to Fiebig, et al., entitled "Real Time Fail Safe Process Control System and Method," assigned to, the IBM Corporation and incorporated herein by reference.

3. Background Art

High availability data processing applications such as process control in a factory environment, scheduling traffic and transportation networks, or scheduling and controlling operations in broadcast communications networks, or large volume financial transaction networks such as federal reserve applications, require a high reliability for the controlling processor. The prior art has provided high availability systems by employing redundant processors in a fail safe configuration wherein a first processor is the primary or active processor which provides actual control commands to the system being controlled and the system further includes a second or standby processor which monitors the operation of the active processor and is ready to take over primary operations in the event that a failure is detected in the active processor. This technique is called hot standby redundant processing.

A particular problem occurs where very large data files are being transferred over a local area network or a wide area network between data processing nodes. Because document image files, for example, are typically 50 Kbytes or larger, high bandwidth data communications networks are required for the communication of such large files between processing nodes. If one processing node suffers a failure and a second processing node in a standby function, steps in to substitute for the failed processor, the rerouting of large image files can present a communications bottleneck which forces an overall reduction in the throughput of large data files in the network.

OBJECTS OF THE INVENTION

It is an therefore an object of the invention to provide improved high availability data processing system.

It is another object of the invention to provide an improved high availability document image data processing system.

It is still a further object of the invention to provide an improved document image data processing system which provides sufficient reserve capacity in its communications links to accommodate the rerouting of large document image files under a failure condition of a component processor in the network.

SUMMARY OF THE INVENTION

These and other objects, features and advantages are accomplished by the system and method for high availability document image and coded data processing, disclosed herein. In the system, a first work group server is used to process image files and coded data files. The first work group server is coupled between an image local area network which primarily communicates image files and has a first utilization level, and a first work group local area network which has at least one workstation processor. The first work group local area network is coupled to a backbone local area network which primarily communicates coded data and has a second utilization level less than the first utilization level. Typically coded data files are relatively small files of less than a kilobyte in size whereas image files typically are at least 50 times larger.

The system further includes a second work group server which processes image files and coded data files, coupled between the image local area network and a second work group local area network. The second work group local area network is coupled to the backbone local area network.

A local area network manager is coupled to both the image local area network and the backbone local area network, for assigning a first work group server destination address to the workstation processor. The local area network manager will receive an alert message over the image local area network, from the first work group server, if the first work group server suffers a failing condition. The local area network manager, in response to the alert, will send a second work group server destination address to the workstation processor. The second work group destination address will enable the workstation processor to communicate over the first work group LAN and over the backbone local area network and over the second work group LAN to the second work group server. The second,work group server will operate in a standby mode, and will step into the role of the primary work group server to provide functions which will substitute for those of the failed first work group server. In this manner, a high availability system is provided without requiring high bandwidth communications links for normally small size coded data files.

DESCRIPTION OF THE FIGURES

These and other objects, features and advantages will be more fully appreciated With reference to the accompanying figures.

FIG. 2 is a flow diagram of a sequence of operational steps for carrying out the method of the invention.

FIG. 3 is a flow diagram of a typical process sequence in accordance with the invention.

DISCUSSION OF THE PREFERRED EMBODIMENT

Figure 1:
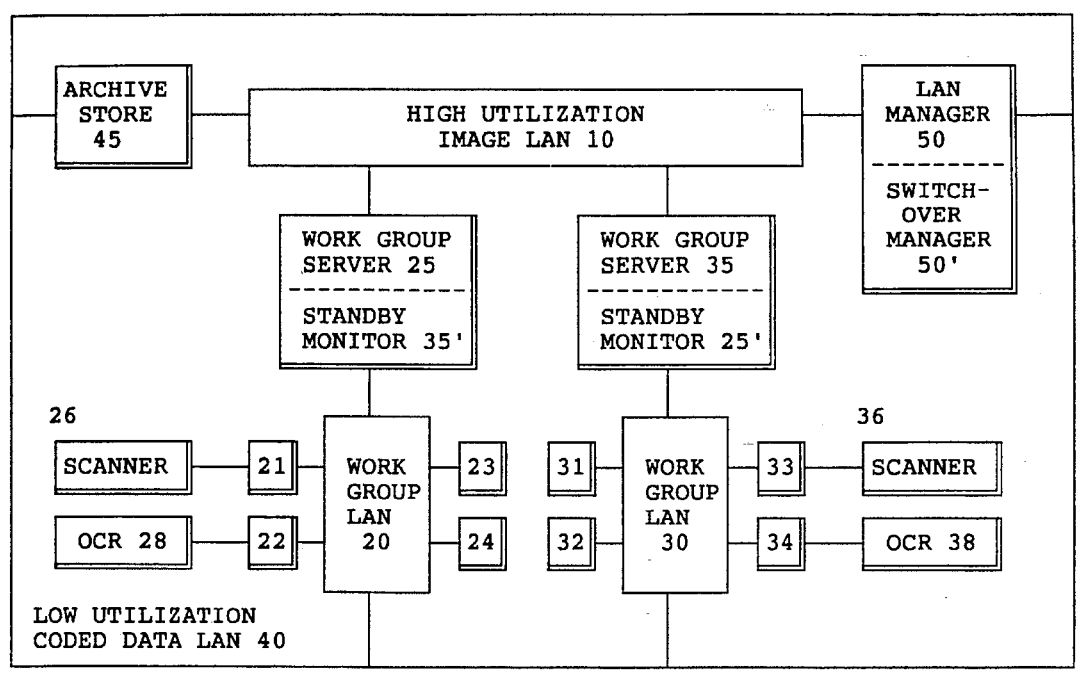
FIG. 1 is a an overall system block diagram of the system for high availability document image and coded data processing invention.

FIG. 1 shows the high availability document image and coded data processing system, in accordance with the invention. The particular application for the system shown in FIG. 1 is to the management and manipulation of digital images of document forms. An example would be the scanning of tax return forms or the scanning of clusters of social security data forms for processing in the Internal Revenue Service or the Social Security Administration, respectively. In such applications, a workstation processor such as processor 21 could be connected to a scanning device to scan in a hard copy of a one or a sequence of documents, creating a corresponding one or a sequence of document images. Each of the document images occupies a substantial storage space, typically 50 Kbytes or more. The workstation processor is connected to a work group local area network (LAN) 20, to which is also connected several other workstations processors 22, 23 and 24. Work is distributed to each of the workstation processors on a demand basis, for example, where operators will scan in, store and display and modify images of document forms. After a document form is processed at a workstation processor 21, for example, it would be transmitted over the image local area network 10 to an archiving device, for example the archiving device 45. Other devices for example could be utilization devices such as processors or communications links which would be coupled to the image local area network 10. The work group server 20 manages the exchange of the large image files between the work group LAN 20 and the image LAN 10.

The work group server 25 processes image files and coded data files. Coded data is for example a file containing character strings in ASCII or other character code, which is either typed in at a keyboard at a workstation processor 21, or alternately which is generated by character recognition operations where a document image is processed by a character recognition processor to produce a character recognition string of alphanumeric characters. Alphanumeric characters are formed into a coded data file which can be associated with the document image file from which it was derived or for which it applies. The work group server 25 is coupled between the image LAN 10 and the work group LAN 20 and manages the exchange of image files and coded data files between the LAN 10 and the LAN 20.

Since the image LAN 10 is designated by transmission of large image files, it is designed to have a high bandwidth and it also has a relatively high utilization factor, that is a greater fraction of the bandwidth capacity for the image LAN 10 is utilized in transmitted image files than would be necessary if the image LAN only transmitted coded data files which are smaller.

The work group LAN 20 is also connected to the backbone local area network 40. The backbone LAN 40 primarily communications coded data between the first work group LAN 20 and the second work group LAN 30 and other devices or systems connected to the coded data LAN 40. Since the coded data LAN 40 is designated for primarily communicating coded data which are typically small files, if the bandwidth capacity of the LAN 40 is the same as the bandwidth capacity of the LAN 10, then the actual utilization of the coded data LAN 40 is less, that is the proportion of the bandwidth for LAN 40 which is used to communicate the coded data files is relatively small, when compared with that corresponding portion for communicating image files on the LAN 10.

A second work group server 35 processes image files and coded data files and is coupled between the image LAN 10 and a second work group LAN 30. The second work group LAN 30 has the workstation processors 31, 32, 33 and 34 attached to it. A local area network manager 50 is coupled to both the image LAN 10 and to the backbone LAN 40. The local area network manager 50 assigns work group server destination addresses to each of the respective workstation processors 21, 22, 23, 24 and to 31, 32, 33 and 34. The work group destination addresses direct each respective workstation processor 21, for example, to communicate with a designated work group server 25 or 35. The control signals for transmitting the work group server destination address from the LAN manager 50 to the respective workstation processors 21, etc., can be transmitted over the coded data LAN 40, or alternately it can be transmitted over the image LAN 10 and through the corresponding work group server 25 or 35.

In order to provide a high availability for the functions performed by the work group servers 25 and 35, they are programmed to serve as standby or backup processors to be substituted for one another in the event of a failure. For example, the work group server 25 is designated as the primary processor for managing the image files and the coded data files in the work group LAN 20. The work group server 35 is designated as the primary processor for managing the image files and the coded data files for the work group LAN 30. In order to provide standby capability for high availability operations, the work group server 25 also is capable of monitoring the failure mode of the work group server 35. This monitoring of the failure mode typically would occur by monitoring a heartbeat periodic signal sent from the work group server 35 over the image LAN 10 to the work group server 25. As long as the heartbeat signal from the work group server 35 is within an expected range, the work group server 25 remains in its standby mode regarding the high availability backup function for work group server 35. If the heartbeat signal from the work group server 35 indicates to the work group server 25 that the server 35 is failing, then the work group server 25 can go into a takeover mode.

The takeover mode can operate in several ways. In the first way, a signal is transmitted to the LAN manager 50 over the image LAN 10, indicating that the work group server 25 detects that the work group server 35 is in a failure mode. The LAN manager 50 can then transmit over the LAN 10 a switchover signal which invokes the hot standby feature in work group server 25, to begin providing server functions to the work group LAN 30. The LAN manager 50 will also signal a work group server 35 and then it is to relinquish its functions in favor of the work group server 25. The work group server 25 will then be capable of performing the additional processing necessary to process image files and coded data files from the work group LAN 30.

One of the problems solved by the invention herein, is how to accommodate the rerouting of the large image files from the work group LAN 30 to the work group LAN 20 for servicing by the work group server 25. Since the work group server 35 is no longer functioning, the route over the image LAN 10 is blocked. Therefore, in accordance with the invention, because the coded data LAN 40 operates at a lower utilization level, there is sufficient bandwidth capacity left in the LAN 40 to accommodate the transmission of the large image files from the work group LAN 30 over the coded data LAN 40 to the work group LAN 20 and then to the work group server 25 for work group server processing. This is managed by the LAN manager 50.

When the LAN manager 50 receives over the image LAN 10 an alert message from the first work group server 35 representing a failing condition of the first work group server, either by a direct signal from the work group server 35, or by an inference of failure derived at work group server 25 and the corresponding alert signal sent from server 25, the LAN manager 50 will perform the following operation. The LAN manager 50, in response to the alert, will send the second work group server destination address, that is the destination address for the work group server 25, to the workstation processors 31, 32, 33 and 34 in the work group LAN 30. This will enable the workstation processors in the work group LAN 30, to communicate over the first work group LAN 30, over the backbone LAN 40, and over the second work group LAN 20, to the second work group server 25. In this manner, a high availability is provided for the local area network communicating links for both the large image files and the relatively small coded data files in a hot standby failure mode.

Turning now to FIG. 2, a flow diagram is shown which illustrates the sequence of operational steps carried out by the system of FIG. 1, to perform the high availability of document image and coded data processing, in accordance with the invention. The method 200 begins with step 202 of processing image files and coded data files in a first work group server coupled between an image local area network primarily communicating image files and having a first utilization, and a first work group local area network, having at least one workstation processor. Then in step 204, primarily communicating coded data from the first work group LAN coupled over a backbone LAN that has a second utilization less than the first utilization. Then step 206 processes image files and coded data files in a second work group server coupled between the image LAN and a second work group LAN, the second work group LAN being coupled to the backbone LAN. Then step 208 assigns a first work group server destination address to the workstation processor using a local area network manager coupled to both the image LAN and the backbone LAN. Then step 210 receives an alert message in the LAN manager over the image LAN from the first work group server, representing a failing condition of the first work group server. Then step 212, sends a second work group server destination address from the LAN manager, to the workstation processor, in response to the alert, to communicate over the first work group LAN, the backbone LAN and the second work group LAN, to the second work group server. In this manner, a high availability operation is achieved for processing document images and coded data files.

FIG. 3 is a flow diagram of the process 300, in accordance with the invention.

The process starts with step 302. In normal mode, workstation processor 21 scans in document image from scanner 26 and sends it over work group LAN 20 to workstation processor 22 for character recognition with OCR 28. Processor 22 transmits OCR coded data over work group LAN 20 and over low utilization coded data LAN 40 to a utilization device, such as the archive store 45.

The step 304: In normal mode, first work group server 25 manages the transmission of the document image from workstation processor 21 or 22 to the high utilization image LAN 10, that transmits it to a utilization device, such as archive store 45. Server 25 sends out heartbeat signals to standby monitor 25' in second work group server processor 35.

Step 306: In a normal mode, workstation processor 33 scans in document image from scanner 36 and sends it over work group LAN 30 to workstation processor 34 for character recognition with OCR 38. Processor 34 transmits OCR data LAN 40 to a utilization device, such as the archive store 45.

Step 308: In normal mode, second work group server 35 manages the transmission of the document image from workstation processor 33 or 34 to the high utilization image LAN 10, that transmits it to a utilization device, such as archive store 45. Server 35 sends out heartbeat signals to standby monitor 35' in the first work group server processor 25.

Step 310: In failure mode, the second work group server 35 begins to fail and this changes the heartbeat signals received by standby monitor 35' in the first work group server 25. In response, the first work group server 25 sends an alarm signal over either the high utilization image LAN 10 or the low utilization data LAN 40 to the LAN manager 50.

Step 312: In response, the switchover manager 50' in the LAN manager 50 sends the destination address for the first work group server 25, over the coded data LAN 40, to each workstation processor 31, 32, 33, and 34 in the work group 30. Also, the switchover manager 50' in the LAN manager 50 sends the destination address for each workstation processor 31, 32, 33 and 34 in the work group 30, over the LAN 40 and LAN 20 to the first work group server 25. Also, the switchover manager 50' sends a disabling signal over LAN 40 and LAN 30 to the second work group server 35.

Step 314: In failure mode, document images from workstation processor 33 or 34 are now sent over the low utilization coded data LAN 40 and the work group LAN 20, to the first work group server processor 25, that transmits them over the high utilization LAN 10 to a utilization device, such as archive store 45.

Although a specific embodiment of the invention has been disclosed, it will be Understood by those having skill in the art, that changes can be made to that embodiment, without departing from the spirit and the scope of the invention.

What is claimed is:

1. A high availability document image and coded data processing system, comprising:

a first work group server processing image files and coded data files coupled between an image local area network (LAN) primarily communicating image files and having a first utilization, and a first work group local area network (LAN), having at least one workstation processor;

said first work group LAN coupled to a backbone LAN primarily communicating coded data and having a second utilization :less than said first utilization;

a second work group server processing image files and coded data files coupled between said image LAN and a second work group LAN, said second work group LAN being coupled to said backbone LAN;

a local area network (LAN) manager coupled to both said image LAN and said backbone LAN; for assigning a first work group server destination address to said workstation processor;

said LAN manager receiving over said image LAN, an alert message representing a failing condition of said first work group server;

said LAN manager, in response to said alert, sending a second work group server destination address to said workstation processor, to communicate over said first work group LAN, said backbone LAN, and said second work group LAN; to said second work group server;

so that a high availability system is provided.

2. A system according to claim 1 wherein said workstation processor employs said second work group server destination address to communicate with said second work group server to process said image files and coded data files in said second work group server.

3. A system according to claim 1 where said alert message is received from said first work group server.

4. A system according to claim 1 where said alert message is received from said second work group server which is monitoring the performance of said first work group server.

5. A method for high availability document image and coded data processing, comprising the steps of:

processing image files and coded data files in a first work group server coupled between an image local area network (LAN) primarily communicating image files and having a first utilization, and a first work group local area network (LAN), having at least one workstation processor;

primarily communicating coded data from the first work group LAN coupled over a backbone LAN that has a second utilization less than the first utilization;

processing image files and coded data files in a second work group server coupled between the image LAN and a second work group LAN, the second work group LAN being coupled to the backbone LAN;

assigning a first work group server destination address to the workstation processor using a local area network (LAN) manager coupled to both the image LAN and the backbone LAN;

receiving an alert message in the LAN manager over the image LAN representing a failing condition of the first work group server;

sending a second work group server destination address from the LAN manager, to the workstation processor, in response to the alert, to communicate over the first work group LAN, the backbone LAN, and the second work group LAN, to the second work group server.

6. A method according to claim 5 wherein said workstation processor employs said second work group server destination address to communicate with said second work group server to process said image files and coded data files in said second work group server.

7. A method according to claim 5 where said alert message is received from said first work group server.

8. A method according to claim 5 where said alert message is received from said second work group server which is monitoring the performance of said first work group server.

* * * * *

UNITED STATES PATENT AND TRADEMARK OFFICE
CERTIFICATE OF CORRECTION

PATENT NO. : 5,566,299
DATED : October 15, 1996
INVENTOR(S) : Douglas W. Billings, et al.

It is certified that error appears in the above-indentified patent and that said Letters Patent is hereby corrected as shown below:

On the title page:

Change the last name of the attorney from "Dillion" to --Dillon--.
Change one of the names in the law firm from "Fradley" to --Bradley--.

Signed and Sealed this

Third Day of December, 1996

Attest:

BRUCE LEHMAN

Attesting Officer

Commissioner of Patents and Trademarks